United States Patent [19]

Behring et al.

[11] Patent Number: 5,669,956
[45] Date of Patent: Sep. 23, 1997

[54] APPARATUS AND METHOD FOR MOLTEN METAL DEPTH DETECTION

[75] Inventors: James A. Behring; William Falk, both of Waukesha, Wis.

[73] Assignee: Midwest Instrument Co., Inc., Hartland, Wis.

[21] Appl. No.: 381,968

[22] PCT Filed: Jun. 11, 1993

[86] PCT No.: PCT/US93/05658

§ 371 Date: May 22, 1996

§ 102(e) Date: May 22, 1996

[87] PCT Pub. No.: WO94/29823

PCT Pub. Date: Dec. 22, 1994

[51] Int. Cl.⁶ .................................... C21B 7/24
[52] U.S. Cl. ................ 75/386; 73/299; 73/301; 266/94; 266/99; 340/618
[58] Field of Search .................. 75/375, 386; 266/94, 266/99; 340/618; 73/299, 300, 301, 302, 303

[56] References Cited

U.S. PATENT DOCUMENTS

| 3,780,581 | 12/1973 | Acre et al. | 73/302 |
| 5,167,155 | 12/1992 | Rodgers | 73/299 |
| 5,198,749 | 3/1993 | Guthrie et al. | 266/99 |

*Primary Examiner*—Melvyn Andrews
*Attorney, Agent, or Firm*—Ryan, Maki, Mann & Hohenfeldt

[57] ABSTRACT

Apparatus and method for determining when the depth of molten (18) poured into a vessel (12) has reached a selected level. A conduit (22) connected to a source of pressurized gas and having an orifice (43) at its distal end (38) restricts the flow of gas out of the conduit which is positioned at a selected level in the vessel. A drop in pressure in the conduit (22) resulting from escape of compressed gas when the distal end (38) is melted by the rising molten metal is detected and signalled to a visible, audible indicator or directly to an electronic controller to discontinue pouring of metal (18) into the vessel (12).

17 Claims, 1 Drawing Sheet

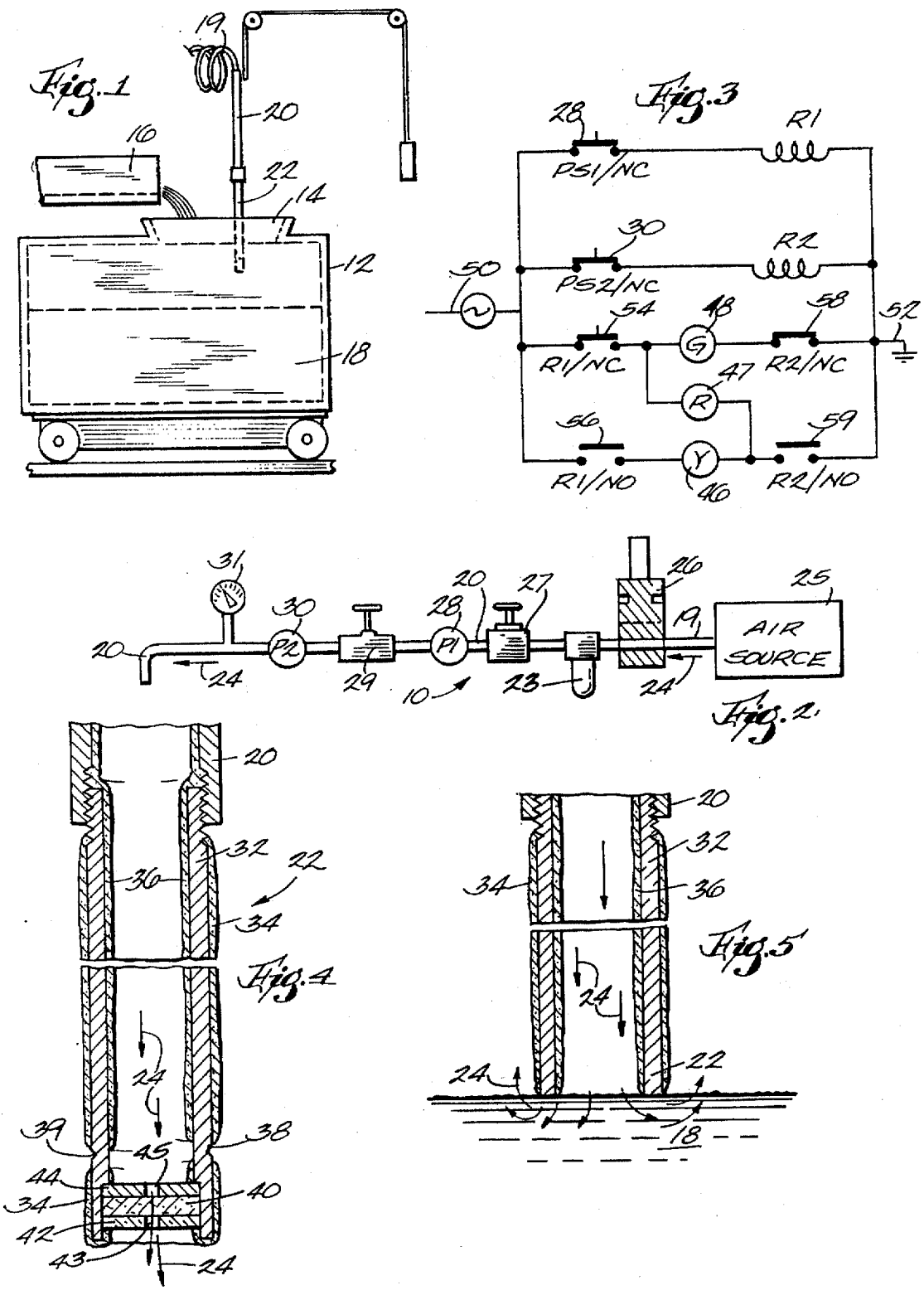

APPARATUS AND METHOD FOR MOLTEN METAL DEPTH DETECTION

FIELD OF THE INVENTION

This invention relates to apparatus and method for depth or fluid level detection of molten metals. More specifically, the invention relates to a method and apparatus for determining when the fluid level of a metal such as molten iron has reached a desired level in a vessel such as the interior of a torpedo car, ingot mold or furnace.

BACKGROUND OF THE INVENTION

Ceramic lined torpedo cars are commonly utilized to transport molten metal from point to point within a steel mill. Determination of the fluid level or depth of molten metal as it is poured into such a car has been a persistent problem. Overfilling of the car causes the need for costly repairs and disruption of the transporting and steel making operation. For example, if the molten metal spills over the top of the car onto the railroad tracks it often becomes necessary to remove and replace a section of the tracks. Conversely, if the proper depth is not attained, the concentration of additives to the metal, such as desulfurizing agents, may be higher than desired or necessary.

Various proposals such as the use of lasers, light sensors, thermocouples, electromagnetic flux detectors, or electrical circuits have all been found to have shortcomings. All of such detection methods are subject to inaccuracies due to inability to account properly for splashing of molten metal, slag or kish on the metal or for light and the tremendous heat emitted from the metal over long periods of time.

A need thus exists for a cost effective system for determination of the fill level in a torpedo car. Such improvements are also needed for such applications as sensing and controlling the level of metal in other receptacles such as ingot molds, furnaces and ladles.

SUMMARY OF THE INVENTION

A principal object of the present invention is to overcome the above-noted shortcomings and to provide a simple, accurate and cost effective means and method for determining the level of molten metal in a torpedo car. A related object is to provide such a system which avoids inaccurate measurements.

One aspect of the invention relates to the use of gas flow and, more specifically, gas pressure measurement to monitor the level of molten metal in a receptacle. Another aspect is to use the measurement of a drop or, alternatively, and increase in measured pressure within a pressurized conduit as a means of molten metal level detection. A related aspect is to utilize the melting (or alternatively the sealing) of a portion of a conduit extending into a vessel being filled with molten metal as an indication that the level of molten metal has reached the depth at which said conduit is positioned.

A further aspect of the invention involves the use of an orifice to restrict the flow out of a conduit to provide a measurable reference gas pressure in a conduit. A related aspect is to utilize pressure drop occasioned by the melting of the conduit and resultant escape of gas pressure to indicate that a desired depth of molten metal has been attained in a vessel. A yet further aspect of the invention is to provide warning means either visible or audible to alert an operator of the fact that the desired fluid level of molten metal has been obtained so that he will manually stop the pouring of metal into the vessel. Alternatively, the signal produced can be utilized to cause, by electrical control, a cessation of pouring of molten metal into the vessel.

In accordance with still further aspect of the invention a signal can be triggered upon plugging of an gas flow conduit as well as by opening of the conduit due to melting thereof. In accordance with yet a further aspect, a vertically movable device can be used by lowering the same at a controlled rate downwardly toward the surface of a molten metal to accurately measure the depth of metal in a partially filled vessel. In accordance with another aspect, a negative pressure, or partial vacuum can be employed in the practice of the invention instead of a positive pressure. An important advantage of the invention results from the fact that the flow of gas through the apparatus of this invention cools the device and prevents premature failure.

Briefly summarized, the invention provides apparatus and methods for determining when the depth of molten metal poured into a vessel has reached a selected level. A conduit connected to a source of pressurized gas and having an orifice at its distal end restricts the flow of gas out of the conduit which is positioned at a selected level in the vessel. A drop in pressure in the conduit resulting from escape of compressed gas when the distal end is melted by the rising molten metal is detected and signalled to a visible, audible indicator or directly to an electronic controller to discontinue pouring or metal into the vessel.

In a preferred embodiment of the invention the conduit is formed from steel piping coated with a ceramic material except at one circumferential strip located near the orifice. The uncoated strip may also be provided with a circumferential notch in order to improve the reliability and reproducibility of the measurements.

The invention will further be set forth in the following detailed description and accompanying drawings wherein:

DRAWINGS

FIG. 1 is a somewhat diagrammatic fragmentary side elevational view showing the use of apparatus of this invention in conjunction with a wheeled rail or torpedo car;

FIG. 2 is a diagrammatic view illustrating operative components of one embodiment of the invention;

FIG. 3 is an electrical diagram illustrating an electrical circuit for use in conjunction with the apparatus shown in the embodiment of FIG. 2;

FIG. 4 is a central cross-sectional view of an immersible component of the apparatus of this invention; and FIG. 5 is a central cross-sectional view of the apparatus of FIG. 4 after the tip portion thereof has been removed by a bath of molten metal.

DETAILED DESCRIPTION

Referring specifically to the drawings, there is shown a system 10 illustrating the apparatus and practice of the method of this invention. In FIG. 1 system 10 is shown in conjunction with a refractory lined rail or torpedo car 12 having an opening 14 for pouring therein of molten metal from a pouring trough 16. In accordance with the invention it is desired to control the level of molten metal 18 so that it does not overflow opening 14 and yet permits filling of the vessel 12 to a desired level. Equipment 10 includes a fluid flow conduit such as connecting hose 19, and metal pipes 20 to convey pressurized gas to an end portion 22 wherein the flow of gas out of fluid flow conduit is restricted. It will be noted that the flow of gas will tend to cool the fluid flow conduit and thus protect the system from inaccuracies caused by premature melting of the components.

The gas used is preferably non-reactive with the molten metal and thus nitrogen or argon are preferred. However, if desired, reactive gases such as air or natural gas can be used instead.

As seen in FIG. 2 in accordance with a preferred embodiment of the invention, the flow of pressurized gas through conduits 19 and 20 is generally indicated by arrows 24. Any source of pressurized gas 25 such as a pre-pressurized tank or an gas compressor can be utilized. Alternatively, a vacuum pump can be utilized in the event that it is desired to use negative pressure rather than positive pressure in the system. A valve 26 is provided in the line in order to permit opening and closing the flow 24 of gas into or out of the apparatus. Valve 26 may either be manually operated or solenoid controlled. Preferably, a water trap 23 and a pressure regulator 27 are also provided in the system. Pressure regulator 27 can also be provided with a pressure gauge (not shown) to provide a visual observation of pressure at that location.

Downstream from the pressure regulator is a pressure sensing switch 28 also identified as P1. A needle valve 29 or similar flow restrictor is placed in the line downstream from pressure sensing switch 28 in order to limit the rate at which flow can occur through line 20 thus resulting in a pressure drop across valve 29. A second pressure sensing switch 30 also identified as P2 is located downstream from needle valve 29. A visual pressure gauge 31 is located downstream from needle valve 29. A measurable pressure exists at switch 30 when the flow of gas out of end portion 22 is sufficiently restricted.

Referring to FIG. 3, there is illustrated circuitry for operating a visual signalling system in accordance with one embodiment of the invention. In accordance with the illustrated embodiment, a series of lights 46, 47 and 48 which are yellow, red and green, respectively, are controlled by pressure sensing switches 28 and 30. A source of electricity 50 such as 110 volts alternating current is shown diagrammatically as well as an electrical ground 52.

As seen in FIG. 3, if there is no pressure in conduit 20, since pressure switches PS1 and PS2 are normally closed, as indicated, current will flow through relays R1 and R2. Simultaneous activation of relays R1 and R2 will cause opening of relay activated switches 54 and 58 which are normally closed and also will close switches 56 and 59 therefore permitting current to flow through yellow light 46. Thus, light 46 is illuminated while lights 47 and 48 are not illuminated when there is no pressure in line 20.

End segment or head portion 22 of the conduit may be from one to several feet in length. After use of the device the remnant of end 22 can be decoupled from the remainder of the conduit and replaced with a new end segment for use in the next depth measurement. End segment 22 can be connected to conduit 20 by means of a threaded coupling or a quick-connect coupling.

As seen in FIG. 4, gas flow out of conduit 20 is restricted by head 22 wherein a plug 40 is secured. Plug 40 may be of a heat resistant material such as steel which may be clamped in place, for example between washers or the like, or may be a ceramic filter that is cemented in place. In the drawings ceramic disks 42 and 44 are positioned to sandwich ceramic filter 40 and are provided with small central openings 43 and 45, respectively. In another preferred embodiment plug 40 is a 1 inch by 1 inch steel plug having a 3/32 inch hole therethrough. When such steel plug 40 is used, disks 42 and 44 can be eliminated. Gas flow 24 is greatly restricted by the combination of filter 40 and openings or apertures 43 and 45.

Therefore, when conduit 20 is pressurized the pressure at switch 30 is elevated, for example to 50% of that at pressure switch 28 in spite of the restriction of flow caused by needle valve 29. The pressure drops at various locations are adjusted by means of altering the setting of the needle valve and the size of the openings through plug 40.

Thus, referring again to FIG. 3, when there is pressure in conduit 20 pressure switches 28 and 30 will both be caused to open therefore discontinuing flow of current through relays R1 and R2. Switches 54, 56, 58 and 59 will therefore all assume the "normal" positions shown in FIG. 3. Current thus no longer flows through yellow light 46 but rather can only flow through green light 48 when pressure within predetermined selected limits is present as measured by both pressure switches 28 and 30.

While the diagram of FIG. 3 shows a system wherein an alarm such as a red light is signalled upon opening of the conduit end 22, the system can also be configured, for example by adding further pressure switches, so that plugging of end 22 and stopping of the gas flow therethrough will also cause signalling of the alarm. In this case both melting and plugging up of the conduit will be signalled indicating either that the molten metal is at the desired level or that a problem exists in the system.

Referring again to FIG. 4, it will be noted that metal conduit 32 of end portion 22 of conduit 20 is coated on its outer surface 34 and inner surface 36 by means of a ceramic coating. Such coating may also be placed at the tip of end portion 22. A segment 38, preferably less than 1 inch and more preferably about 1/8 inch in length adjacent disk 44, however, is left uncoated, at least on its outer surface. Due to a combination of the fact that gas 24 is continuously flowing out of orifice 43 and due to the heat resistant nature of the surfaces of disk 42 as well as ceramic coating 34, the apparatus shown is not affected by splashing of molten metal from the surface of pool 18. However, after the surface of molten metal 18 reaches the uncoated portion 38 adjacent tip 22 of conduit 20, tip 22 is rapidly dissolved by molten metal 18 so that the end of conduit 20 is opened as seen in FIG. 5. Consequently, the pressure at switch 30 drops markedly due to the escape of gas 24 as illustrated in FIG. 5.

While it is preferred that the conduits in the vessel 12 be coated with a ceramic material, heat resistant metal or Pyrex tubing can be substituted. Commercially available ceramic coated steel pipes are well suited for used in connection with the invention. For reasons of economy, steel pipe can be utilized for this purpose, particularly in applications where undue splashing of molten metal is not encountered. A notch 39, similar to a single circumferential screw thread is preferably formed in the uncoated segment 38. Such a notch 39 ensures the exposure of bare metal of pipe 32 and produces a precise, reproducible location for dissolution or melting of pipe 32, thereby contributing to the accuracy of the apparatus.

Referring again to FIG. 3, switch 28 remains open and relay R1 inactivated because of pressure upstream from needle valve 29. Pressure switch 30, however, due to the drop in pressure returns to its normally closed position shown in FIG. 3. Current will thus flow through relay R2 thereby causing normally closed switch 58 to open and normally open switch 59 to close. Due to the opening of switch 58 current no longer flows through green light 48 but rather will flow through red light 47. Illumination of red light 47 serves as a highly visible signal to an operator of metal pouring equipment 16 alerting him/her of the fact that molten metal 18 has reached its desired level within vessel 12.

It will be apparent to those skilled in the art that rather than causing red light to illuminate as shown in connection with the foregoing description that instead, or in addition, an audible horn could be caused to be sounded upon melting away of tip portion 22 of the apparatus. Additionally, signals from switches 28 and 30 can also be utilized to directly discontinue flow of molten metal from pouring source 16 by triggering an appropriate electrically controlled flow control mechanism. Thus, it will be readily apparent that such differing embodiments can readily be provided in accordance with the teachings of this invention.

While preferred embodiments have been disclosed herein, it will be apparent to those skilled in the art that additional modifications can be made without departing from the spirit of the invention as defined in the following claims.

What is claimed is:

1. A method of determining when the depth of metal poured into a vessel has reached a selected level comprising:

providing a gas flow conduit having an orifice at the distal end thereof, to restrict the flow of gas through said conduit, positioned so that the distal end of said conduit is at said selected level, said conduit being provided with means to measure and indicate the changes in pressure within said conduit, pouring molten metal into said vessel until, upon reaching said selected level, a portion of said conduit is melted, detecting a change in pressure within said conduit resulting from opening of the conduit to the atmosphere, and discontinuing the pouring of molten metal into said vessel upon detection of such pressure change.

2. A method according to claim 1 wherein:

detection of a drop in pressure triggers a visual signal to alert an operator that the selected level has been attained.

3. A method according to claim 1 wherein:

an audible signal is sounded to alert the operator that the selected level has been attained.

4. A method according to claim 1 wherein:

an electrical signal is triggered by a drop or increase in pressure and said signal is used to operate a control mechanism to cause cessation of pouring said molten metal into said vessel.

5. A method according to claim 1 wherein:

a flow restrictor is positioned within said conduit at a location proximal to said vessel and the pressure of gas within said conduit is constantly monitored on the proximal side and the distal side of said flow restrictor.

6. A method according to claim 2 wherein:

said visual indicator comprises a green light that is activated when said pressure is at an elevated level, a red light that is activated when said pressure drops, and a yellow light that indicates that said system is operational but has not yet been activated.

7. Apparatus for determining when the depth of metal poured into a vessel has reached a selected level comprising:

a source of pressurized gas, an gas flow conduit having its proximal end connected to said source and having an orifice at the distal end thereof to restrict the flow of gas out of said conduit, said conduit being positioned so that the distal end of said conduit at said selected level, means for detecting and signalling a drop in pressure within said conduit resulting from escape of compressed gas therefrom when a portion of said conduit is melted, and, an indicator responsive to a signal from said detecting and signalling means to indicate that the molten metal has reached said selected level.

8. Apparatus according to claim 7 wherein:

said indicator is a visual signally observable means.

9. Apparatus according to claim 7 wherein:

said indicator is a means that causes an audible signal to be sounded to alert an operator that the selected level has been attained.

10. Apparatus according to claim 7 wherein:

means to cause an electronic signal is triggered by the drop in pressure and said signal and is connected to means to operate a control mechanism to cause cessation of pouring said molten metal into said vessel.

11. Apparatus according to claim 7 wherein:

a flow restrictor is positioned within said conduit at a location proximal to said vessel and means are included to monitor the pressure of gas within said conduit on the proximal side and the distal side of said flow restrictor.

12. Apparatus according to claim 8 wherein:

said visual indicator comprises a green light that is activated when said pressure is at an elevated level, a red light that is activated when said pressure drops, and a yellow light that indicates that said system is operational but has not yet been activated.

13. Apparatus according to claim 7 wherein said conduit is comprised of metal coated with ceramic except at an uncoated section adjacent to said orifice.

14. Apparatus according to claim 13 wherein said orifice comprises a ceramic material.

15. Apparatus according to claim 13 wherein said uncoated section is provided with a circumferential notch around said conduit whereby the pipe melts precisely at the notched location when immersed in molten metal.

16. Apparatus according to claim 7 wherein said conduit comprises steel pipe.

17. A method according to claim 1 wherein said gas comprises nitrogen.

* * * * *